United States Patent Office 3,223,475
Patented Dec. 14, 1965

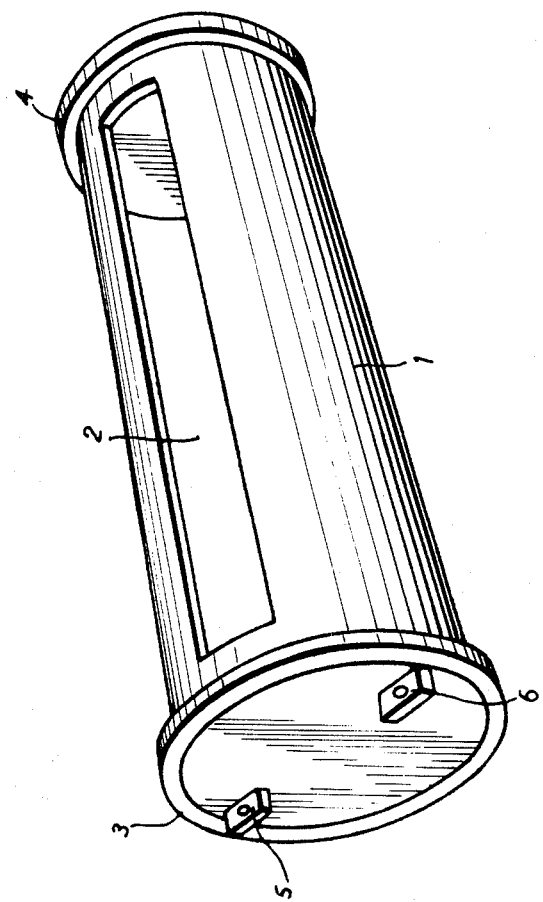

3,223,475
PROCESS FOR THE PREPARATION OF URANIUM MONOCARBIDE POWDER
Pierre Blum and Claude Moreau, Grenoble, France, assignors to Commissariat a l'Energie Atomique, Paris, France
Filed July 29, 1960, Ser. No. 46,233
Claims priority, application France, Aug. 5, 1959, 802,093; May 18, 1960, 827,484
5 Claims. (Cl. 23—14.5)

The present invention relates to a novel process and an apparatus for the preparation of a powder of substantially pure uranium monocarbide.

The interest of uranium monocarbide is due to the numerous advantages which it has for its use as a nuclear fuel. The dilution of fissile uranium is very low and the diluting element, carbon, is nucleonically inert; the consumption rate or "burn-up" of such a fuel is high; its isotropy gives it an excellent mechanical form.

Shaped articles made of uranium monocarbide have only a low mechanical resistance up to temperatures of the order of 1000° C.; uranium monocarbide has a high point of fusion of the order of 2590° C.; it has a perfect stability as regards sodium and is very good as regards water at low temperature, despite what certain authors have said, who were probably working with a material containing the dicarbide. Consequently, it is very easy, by way of an oxidation treatment, to recover uranium from rods of uranium monocarbide fuel after their utilisation in a reactor.

For all these reasons, it is useful to have a good process for the preparation of uranium monocarbide.

The known preparations are based on three types of reaction; the carbonisation of uranium by graphite, the carbonising reduction of an oxide of uranium by graphite and the carbonisation of uranium by a gaseous hydrocarbon, particularly methane.

For the carbonisation of uranium by graphite, either a so-called "dehydrated" uranium powder is used or uranium obtained from the reduction of uranium dioxide by calcium; this uranium is mixed with very fine graphite powder having a particle size of the order of 20 microns. The carbonisation lasts for about 4 hours under vacuum at temperatures of the order of 1100° to 1500° C.

For the carbonising reduction of an oxide of uranium, which is most often the dioxide, by means of graphite, powders are mixed and agglomerated and the agglomerate is subjected under vacuum for 2 hours to a temperature of 1600° C.

The two methods lead either to sponges or to massive pieces which it is necessary to crush and grind. These operations risk oxidation of the carbide and thus introduce impurities into it. It is thus necessary to operate in the absence of air, under an argon atomsphere, and to use special crushers, with tungsten carbide balls for example. These operations are long and delicate and, as they follow carbonization at high temperature, are not economical. Also, it is not possible to obtain in this manner compact granules of carbide the particle size of which is higher than 50 microns and a considerable fraction of the granules have a particle size lower than 20 microns and thus are pyrophoric. Consequently, these powders sinter very difficultly.

The carbonisation of uranium by a gaseous hydrocarbon, particularly by methane, is obtained by reacting, at a temperature between 625° and 900° C., a stoichiometric quantity of methane and a "dehydrated" uranium powder, in such a manner as to limit the carbonisation so as to obtain uranium monocarbide.

If statistically a powder of uranium monocarbide is obtained, this is not necessarily pure uranium monocarbide, but a mixture of unreacted uranium, uranium monocarbide and uranium dicarbide.

The presence of uranium dicarbide is very objectionable, firstly because this compound represents a considerable dilution of the fissible element, then because it introduces an element of antisotrophy which is unfavourable to the mechanical form of the fuel elements and, finally, because it is very sensitive to corrosion by the usual cooling fluids.

All those disadvantages explain why, despite its considerable advantages, uranium monocarbide has not been developed for use as a nuclear fuel.

The present invention has the object of providing a process for obtaining a sinterable powder of uranium monocarbide which avoids the disadvantages mentioned above.

The novel process consists in effecting the carbonisation of a uranium powder by heating with a carbonising material and in continuing to heat the carbonised powder until its transformation into substantially pure uranium monocarbide.

The process thus comprises two successive stages, carbonisation and diffusion of the carbon, in the course of which, according to an important preferred feature of the invention, the powder is continually stirred.

An important embodiment consists in the use of a gaseous hydrocarbon for the carbonisation of the uranium powder; there can be used, in particular, an aliphatic hydrocarbon, such as methane, ethane, propane, butane, pentane or hexane.

The temperature should be lower than 950° C. and preferably between 700° and 900° C. The carbonisation can be effected at a different temperature from that at which the diffusion treatment occurs, but always below 950° C.

The present invention also consists in the following characteristic features taken separately or in combination.

Operation of the process is effected in a sealed reaction chamber where, after introduction of the uranium powder, a vacuum is produced during elevation of the temperature; carbonisation is effected by the introduction of a quantity of gaseous hydrocarbon preferably equal to 10 times the stoichiometric quantity corresponding to uranium monocarbide, until a proportion of combined carbon of 4.8% is obtained; this proportion is determined by control of the partial pressure of the gaseous hydrocarbon. The diffusion is effected, after evacuation of the residual gaseous hydrocarbon and resubmission under vacuum.

After introduction of the uranium powder into the sealed chamber, an inert atmosphere is produced, preferably of argon, during elevation of the temperature; carbonisation is then effected by introduction of a continuous current of gaseous hydrocarbon which sweeps out the inert atmosphere until a proportion of combined carbon of 4.8% is obtained, measured thermogravimetrically; diffusion is effected after evacuation of the gaseous hydrocarbon by sweeping out with a continuous current of inert gas, preferably argon.

The temperature drop after the diffusion treatment occurs either under vacuum or in an inert atmosphere, preferably argon.

The gaseous hydrocarbon is preferably methane, butane or propane.

This process is based on clarification by the inventors of the mechanism of the reaction of carbonisation of uranium by a gaseous hydrocarbon. This is a complex reaction which comprises partly the catalytic decomposition of the gaseous hydrocarbon in contact with the uranium, followed by carbonisation thereof and, partly, a reaction involving diffusion of the carbon in the uranium. The respective rates of these two reactions control the appearance of the uranium dicarbide phase. These rates depend upon temperature, which consequently plays a considerably important part.

Thus at temperatures lower than a temperature T, the rate of decomposition of the gaseous hydrocarbon is lower than the rate of diffusion of the carbon in the uranium and this is all the more as the temperature becomes the lower. The product which results from operation effected in this temperature zone is pure monocarbide.

At temperatures higher than the temperature T, the rate of decomposition of the gaseous hydrocarbon is higher than that of the diffusion of carbon in uranium. There is thus a superabundance of carbon and the formation, at least partially, of uranium dicarbide occurs.

Experimental researchers have shown that the value of the temperature T is of the order of 850° C. In practice, two solutions appear to be applicable for obtaining pure uranium monocarbide as a sinterable powder.

One of these consists in conducting the reaction at a temperature as low as possible, below 850° C., utilising a stoichiometric quantity of gaseous hydrocarbon. In this case, experiments have shown that, if it is desired to obtain a rate of diffusion which is sufficiently greater than the rate of carbonisation for the risk of formation of uranium dicarbide to be eliminated, it is necessary to operate at a temperature of the order of 700° C. At temperatures lower than 750° C., the rate of the overall reaction, which is a function of temperature, is insufficient to ensure an economic production of uranium monocarbide. This solution is thus not practical on an industrial scale, although it can be carried out on a laboratory scale.

According to the second solution, an excess of gaseous hydrocarbon is used at a temperature above 850° C. The carbonisation is thus allowed to attain the theoretical percentage corresponding to formation of the monocarbide. At this stage, the product obtained was a mixture of uranium, uranium monocarbide and uranium dicarbide. In fact, each grain of the powder comprises this mixture divided into three zones: a superficial zone of the grain comprising uranium dicarbide, an intermediate zone comprising uranium monocarbide and a central zone comprising non-carbonised uranium. On carbonisation being terminated, the source of carbon, namely the gaseous hydrocarbon, is discontinued and heating is then carried out. This solely produces the diffusion reaction which is prolonged until the distribution of the carbon is homogeneous. The final product obtained is thus an eminently sinterable powder of pure uranium monocarbide.

It will further be noted that this second mode of operation can be carried out at temperatures lower than 850° C. by the use of a special system of stirring.

As the overall reaction rate is a function of temperature, it would seem to be of interest to operate at a temperature as high as possible. This is not the case. In fact, on attaining the temperature of 900° C., another phenomenon is manifested; this is the natural sintering of the powder which, on the one hand, favours superficial over-carbonisation and, on the other hand, arrests subsequent diffusion of the carbon towards the cores of the granules. From 950° C. upwards, it is impossible to obtain the proportion of 4.8% by weight of carbon corresponding to uranium monocarbide.

The particle size range of the initial uranium powder is an important factor, directly connected to the rate of diffusion of the carbon. Economically, it is of interest to diminish as much as possible the time of the diffusion treatment, which is equivalent to choosing an initial uranium powder having particles as fine as possible while remaining within limits such that the uranium monocarbide powder remains readily sinterable.

Experiments show that this preferred particle size range lies from 1 to 100 microns.

In order to diminish the time of the diffusion treatment, it is very important to ensure a perfect homogeneity of carbonisation, such that each granule of the powder comprises an equal proportion of the superficial uranium dicarbide phase, in order to limit diffusion of the carbon to the interior of each grain instead of between one grain and another. It is thus necessary constantly to renew the gas/grain interface which is effected by a continuous mixing or stirring of the uranium powder.

The best conditions for obtaining the sinterable powder of pure uranium monocarbide by the process according to the invention are as follows:

(1) Fine particle size of the initial uranium powder, preferably from 1 to 100 microns;

(2) Continuous stirring of the powder during the course of the reaction;

(3) Rapid elevation of the temperature of the powder, under vacuum or in an inert atmosphere, preferably argon, to the temperature of the reaction stage;

(4) Temperature of the stage for the carbonisation treatment and the diffusion treatment between 700° and 900° C.;

(5) Carbonisation in the presence of a quantity of gaseous hydrocarbon equal to at least 10 times the stoichiometric quantity corresponding to uranium monocarbide, for a time of the order of 1 to 2 hours permitting a proportion of carbonisation of 4.8% by weight of carbon to be obtained;

(6) Diffusion treatment under vacuum or an inert atmosphere, preferably argon, for a time of the order of 3 to 5 hours;

(7) Cooling of the uranium monocarbide powder under vacuum or an inert atmosphere, preferably argon.

As improvement of the stirring of the powder has a considerable importance, a preferred variant of the invention consists in stirring the powder, during heating, in such a manner that each grain rolls on the surface of the pile of powder in direct contact with the gaseous phase.

The known stirring devices, such as vibrating or shaking tables, slow agitators or the like, permit a homogeneous carbonisation to be obtained. However, these devices, if they renew the gas/granule interface, do not permit the grains to roll on the surface of the pile of powder in direct contact with the gaseous hydrocarbon. The latter mode of agitation permits the rate of catalytic decomposition of the gaseous hydrocarbon in contact with the uranium powder to be accelerated and the temperature T to be lowered below that at which the rate of catalytic decomposition of the gaseous hydrocarbon is lower than the rate of diffusion of the carbon in the uranium. The agitation device which will be described below permits this temperature T to be reduced by about 100° C. and thus to go from 850° to 750° C. This reduction of the temperature T is very advantageous, because the risks of sintering by local overheating are substantially eliminated.

This process is also well applicable to "dehydrated" uranium powders as well as to uranium powders prepared by calciothermy or magnesiothermy. The processes for obtaining uranium by calciothermy or magnesiothermy permit powders to be obtained having a particle size between 1 and 100 microns, with substantially spherical grains. These powders are thus completely suitable for obtaining a powder of pure uranium monocarbide by the process according to the invention.

The special stirring according to the invention can be effected by a method analogous to the "barrel" method employed in electroplating. The powder is placed in a drum provided with perforations having a diameter less than 1 micron and the drum is disposed inside a heated sealed chamber and rotated. The grains of powder entrained by the walls of the drum are lifted and, at the moment when they pass through the apex of the natural cone of rest, fall by rolling on the surface of the pile of powder.

This method permits reduction of the temperature T; although the perforations of the drum necessary for gas/grain contact modify the spherical form of the grains of powder and the particle size thereof by creating finer grains, this is not an unfavourable influence on the sinterability of the powder.

The invention comprises a special device permitting a very efficacious stirring, avoiding the disadvantage mentioned.

This device is described below with reference to FIG. 1 of the accompanying drawing.

As shown in the drawing, a cylinder 1 is provided, of a material which is inert to uranium and uranium carbide, for example silica or alumina. The cylinder 1 comprises at its upper part an aperture 2 permitting charging of the uranium powder and discharge of the uranium monocarbide powder. The two ends of the cylinder 1 are closed and provided, at their periphery, with two rings 3 and 4 serving as roller guide ways. These rings 3 and 4 support the cylinder 1 during its rotation by rolling on balls or rollers (not shown) fixed to the internal wall of the reaction chamber, which is itself cylindrical. On one of the ends of the cylinder 1, two lugs 5 and 6 are fixed on which are mounted two arms (not shown) for rotating the cylinder 1.

In a preferred embodiment of the stirring device, the two lugs 5 and 6 are provided with two rods of soft iron, which are alternately affected by the poles of two electromagnets disposed outside the reaction chamber. The two electromagnets receive impulses of adjustable frequency through the intermediary of an electronic time base. This device permits the cylinder 1 to effect an alternating rotation of ±45° about a horizontal axis passing through the lugs 5 and 6. The amplitude of this oscillation can always be modified by relative displacement of the exterior electromagnets. This arrangement for effecting alternate rotation of the cylinder 1 avoids any passage of a rotating shaft through the wall of the reaction chamber and permits a perfect sealing of the latter to be maintained.

Examples are described below, by way of illustration only, of the process for obtaining a sinterable powder of pure uranium monocarbide in accordance with the invention. All equivalent means can be used without exceeding the scope thereof.

*Example 1*

A uranium powder having a particle size from 8 to 12 microns is disposed in a reaction chamber, which is then evacuated. The temperature is progressively taken to 850° C.; this rise in temperature lasts for 30 minutes. There is then introduced into the chamber a quantity of methane equal to 10 times the stoichiometric quantity corresponding to uranium monocarbide. The carbonisation treatment lasts 1 hour 30 minutes; at the end of this time, a proportion of combined carbon of 4.8% is obtained; control of the proportion is effected by measuring the partial pressure of methane in the reaction chamber. Vacuum is again applied and the chamber is maintained at about 850° C. for 4 hours, which constitutes the diffusion treatment. The temperature is then lowered, while maintaining the chamber under vacuum. All the time the powder is disposed in the reaction chamber, it is subjected to continuous stirring.

*Example 2*

A uranium powder having a particle size between 20 and 35 microns is charged into a reaction chamber, where argon is introduced. The temperature is progressively raised to 800° C.; this rise in temperature lasts 30 minutes; the chamber is then swept through with a continuous current of butane. The carbonisation treatment lasts 2 hours; at the end of this time, a proportion of combined carbon of 4.8% by weight is obtained; control of this proportion is effected thermogravimetrically. The butane inlet is closed and the chamber is swept through with a continuous current of argon, while the powder is maintained at 800° C.; this diffusion treatment lasts 4 hours. The temperature is then lowered while continuing to sweep through the chamber with the inert gas. During the whole of its stay in the reaction chamber, the powder is subjected to continuous stirring.

*Example 3*

A uranium powder having a particle size from 5 to 10 microns is charged into the cylinder 1 of the device shown in the figure through the opening 2. The cylinder 1 is then introduced into the reaction chamber which, after being sealed, is placed under vacuum. The cylinder 1 is then rotated alternately with a frequency of agitation of 45 periods per minute. The temperature is then raised to 750° C.; this rise of temperature lasts 20 minutes. Then there is introduced into the chamber a quantity of methane equal to 10 times the stoichiometric quantity corresponding to uranium monocarbide. The methane pressure prevailing in the chamber, measured either by a platinum wire recording manometer or by a potentiometric membrane collector, is 300 mm. Hg. The temperature of 750° C. is maintained for about 1 hour 30 minutes, at the end of which time the pressure of the mixture of methane and hydrogen formed attains 330 mm. Hg, which corresponds to a proportion of combined carbon of 4.8% by weight. The carbonisation treatment is then terminated; after again subjecting the chamber to vacuum, the diffusion treatment is carried out for 4 hours and at the same temperature. The uranium monocarbide powder is then allowed to cool slowly, after stopping the alternate rotation of the cylinder 1, and is withdrawn from the reaction chamber. A new carbonisation can then be commenced. The pure uranium monocarbide formed retains its initial particle size and the granules retain their sphericity.

*Example 4*

A uranium powder having a particle size between 10 and 15 microns is used and operation occurs at 725° C., all the other conditions being those of Example 3, particularly the manner of stirring the powder. The carbonisation requires 2 hours. The uranium monocarbide obtained is identical with that of Example 3 as regards its particle size.

The process described permits a powder to be obtained which is eminently suitable for sintering and comprises pure uranium monocarbide having the following characteristics:

Very high purity of the powder, because in contrast to known processes, its preparation does not necessitate a final grinding which inevitably leads to contamination;

Predetermined particle size of the uranium monocarbide powder; this is in effect the particle size of the initial uranium powder and it is thus easy to determine the granular size as a function of the sintering application which is desired;

Possibility of obtaining a powder having particles which are in as spherical a form as possible, the carbonisation treatment not modifying the form of the grains by reason of the diffusion mechanism; this possibility is very favourable for a subsequent sintering of the uranium monocarbide powder.

We claim:

1. A process for producing pure, finely divided and sinterable uranium monocarbide comprising a first stage of heating pure powdered uranium metal in contact with an aliphatic gaseous hydrocarbon in an amount larger than the stoichiometric amount providing the required carbon content at a temperature between 700 and 900° C. until the uranium metal has absorbed about 4.8% carbon and a second stage of heating the carbonised uranium metal in an atmosphere selected from the group consisting of a vacuum and a rare gas at a temperature between 700 and 900° C. until the uranium metal is completely converted into uranium monocarbide the powdered material being continuously stirred by tumbling in both of said stages.

2. A process as described in claim 1 in which the rare gas is argon.

3. A process as described in claim 1 in which the temperature in both said stages is maintained between 700 and 850° C.

4. A process as described in claim 1, in which the aliphatic gaseous hydrocarbon is selected from the group consisting of methane, ethane, propane and butane.

5. A process as described in claim 1, in which the second heating stage is conducted for from 3 to 5 hours.

References Cited by the Examiner

UNITED STATES PATENTS

| | | | |
|---|---|---|---|
| 698,704 | 4/1902 | Hart | 23—279 X |
| 2,144,251 | 1/1939 | Bartholomew | 23—279 |
| 2,521,937 | 9/1950 | Newton | 23—14.5 |
| 2,580,349 | 12/1951 | Fisher | 23—14.5 |
| 2,778,716 | 1/1957 | Bagley | 23—279 |

OTHER REFERENCES

Accary "Nuclear Power," vol. 5, No. 50, pp. 122, 123, June, 1960.

AEC Document, B.M.I. 1441, pp. 64–66, May 31, 1960.

AEC Document, N.Y.O., 2688, pp. 1, 3, 5, 6, 8, 10, 12, 15, 16, 21, 23, 24, 29, 31, 35 and 36, June 13, 1960

Murray et al.: "2nd U.N. Int. Conf. on Peaceful Uses of Atomic Energy," vol. 6, pp. 543–545, Sept. 13, 1958.

BENJAMIN R. PADGETT, *Acting Primary Examiner.*

CARL D. QUARFORTH, ROGER L. CAMPBELL, *Examiners.*